United States Patent [19]

Haefner et al.

[11] Patent Number: 5,758,307
[45] Date of Patent: May 26, 1998

[54] NORMALIZED MISFIRE DETECTION METHOD

[75] Inventors: Donald R. Haefner, Troy; Joseph S. Mazur, Livonia, both of Mich.

[73] Assignee: Eaton Corporation, Cleveland, Ohio

[21] Appl. No.: 789,034

[22] Filed: Jan. 27, 1997

[51] Int. Cl.$^6$ .................................................. G01M 15/00
[52] U.S. Cl. ............................ 701/101; 73/115; 73/116; 73/117.3
[58] Field of Search ........................... 73/115, 116, 117.2, 73/117.3; 364/431.03; 701/101

[56] References Cited

U.S. PATENT DOCUMENTS

| | | | |
|---|---|---|---|
| 4,050,296 | 9/1977 | Benedict | 73/116 |
| 4,147,054 | 4/1979 | Hohenberg et al. | 73/117.3 |
| 4,539,841 | 9/1985 | Schroeder et al. | 73/116 |
| 4,892,075 | 1/1990 | Iriyama et al. | 73/115 |
| 5,020,360 | 6/1991 | Brosi et al. | 73/115 |
| 5,105,657 | 4/1992 | Nakaniwa | 73/117.3 |
| 5,109,825 | 5/1992 | Joos et al. | 123/479 |
| 5,193,513 | 3/1993 | Marko et al. | 73/117.3 |
| 5,351,528 | 10/1994 | Fukui et al. | 73/115 |
| 5,386,723 | 2/1995 | Wier | 73/115 |
| 5,415,036 | 5/1995 | Park | 73/117.3 |
| 5,442,954 | 8/1995 | Fukui et al. | 73/115 |
| 5,505,077 | 4/1996 | Fukui et al. | 73/115 |
| 5,559,280 | 9/1996 | Kovacich et al. | 73/35.13 |
| 5,563,332 | 10/1996 | Yasuda | 73/35.08 |
| 5,571,958 | 11/1996 | Hoshina | 73/117.3 |
| 5,574,217 | 11/1996 | McCombie | 73/116 |

OTHER PUBLICATIONS

Sae Technical Paper No. 940379—A New Combustion Pressure Sensor for Advanced Engine Management—Mar. 1994.

*Primary Examiner*—George M. Dombroske
*Attorney, Agent, or Firm*—Roger A. Johnston

[57] ABSTRACT

A misfire detection system and method for use in conjunction with an internal combustion engine. An engine cylinder has a pressure sensor disposed therein for providing a signal indicative of the pressure in the cylinder's combustion chamber. Compression pressure measurements are obtained at crankshaft angles reached prior to the top dead center position of piston travel. For crankshaft angles greater than that at which top dead center is reached, the pressure measurements are reflected about a vertical axis extending through the top dead center point. The reflected compression pressures for crankshaft angles reached after the top dead center point are subtracted from the actual compression chamber measurements obtained over those crankshaft angles during the power stroke of the engine. The difference values are integrated over a range of crankshaft angles to produce a difference pressure integral which is normalized through multiplication by an optional factor and then subsequent division by the maximum pressure occurring in the compression chamber during the engine's power stroke. The resulting normalized integral value is compared to a threshold, below which partial or complete engine misfire is presumed.

11 Claims, 2 Drawing Sheets

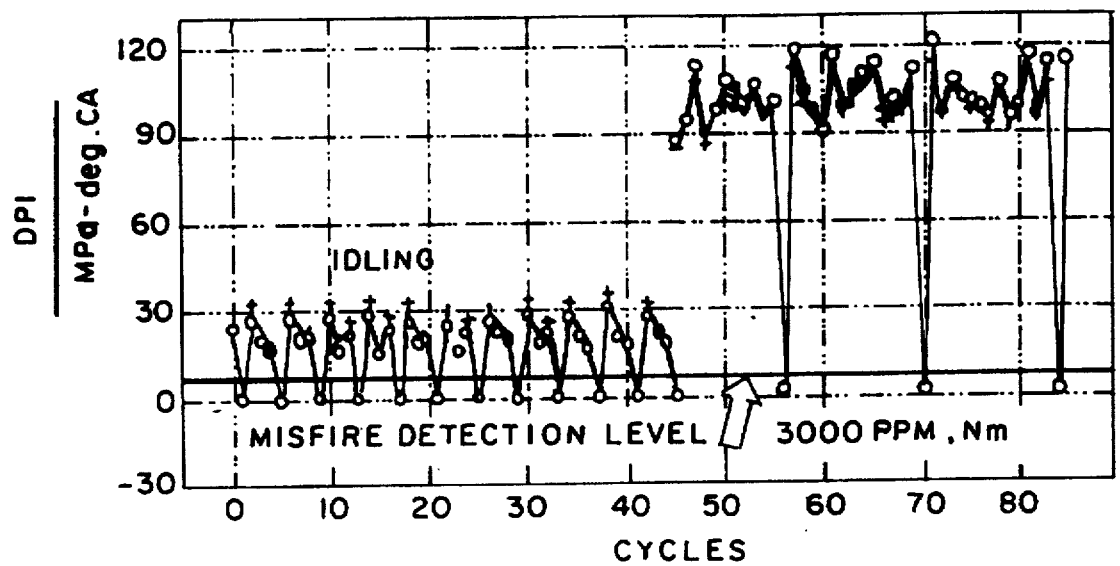
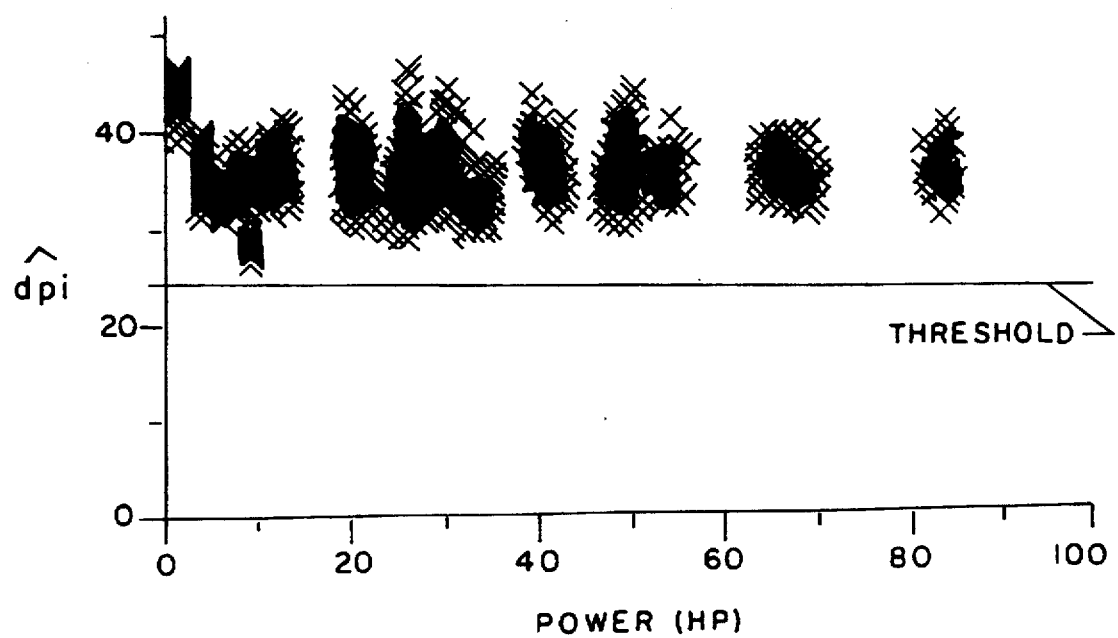

NORMALIZED MISFIRE DETECTION METHOD

BACKGROUND AND SUMMARY OF THE INVENTION

The present invention relates generally to an apparatus and method for detecting misfire in an internal combustion engine, and more particularly to an apparatus and method which detects the presence or absence of misfire utilizing engine cylinder pressure sensor data.

In four-stroke internal combustion engines, a plurality of cylinders are operated through a four stage cycle which includes an intake stroke, a compression stroke, a power stroke and an exhaust stroke. During this process a mixture of fuel and air is taken into a combustion chamber and compressed by a movable piston. A spark is generated by applying a high voltage to an ignition plug and the mixture is ignited and burned, thereby forcibly moving the piston and providing power. A partial or complete failure in causing the burning of the air/fuel mixture is called misfire. Adverse consequences of persistent misfire, whether partial or complete, include a loss of engine power as well as an undesirable flow of fuel into the exhaust system.

Various approaches for detecting misfire in internal combustion engines include monitoring engine crankshaft velocity, measuring the time between successive combustions, optically checking for the presence of ignition sparks, measuring exhaust gas temperature and monitoring the electrical characteristics of ignition signals. An additional approach that has been shown to be particularly effective involves measuring the pressure in each of the engine's combustion chambers. These pressure measurements are generally obtained using electronic pressure transducers mounted through a port in the combustion chamber which provide an electrical signal indicative of cylinder pressure. The pressure measurements obtained are compared to one or more predetermined thresholds below which misfire is presumed. This method, however, requires a high degree of accuracy in the pressure sensor readings which can be difficult to achieve in an environment such as an engine cylinder.

One method for utilizing pressure data to effectively detect misfire without requiring such high sensor accuracy is taught by Brosi et al. in U.S. Pat. No. 5,020,360, the disclosure of which is hereby incorporated herein by reference, as well as by Herden and Kusell in a related SAE paper entitled "A New Combustion Pressure Sensor for Advanced Engine Management", 1994, also incorporated herein. Brosi and Herden et al. provide compensation for subtle inaccuracies in sensitive pressure sensor data by calculating a difference pressure integral (dpi) rather than using absolute pressure measurements.

Calculation of this difference pressure integral begins with measurement of the pressure prevailing in the combustion chamber of an engine cylinder during the intake and compression strokes, prior to and without the influence of an ignition event. This "compression pressure" is measured as a function of the crankshaft angle, up to a crankshaft angle corresponding to the top dead center (TDC) position of the piston. For crankshaft angles above TDC, the compression pressure data is reflected about a vertical line running through the top dead center point to produce a reflected pressure curve. (See FIG. 2). These reflected pressure values are stored in memory and subtracted from the combustion chamber pressure actually measured during the combustion and power strokes of engine operation to produce "combustion pressure" values, generally indicative of the incremental pressure increase in the chamber caused by the combustion of the air/fuel mixture. The combustion pressure values are then integrated over a predetermined range of crankshaft angles to produce the difference pressure integral. For resulting integral values that are extremely low or negative in sign, misfire is presumed.

However, the combustion pressures obtained necessarily depend upon the speed and loading of the engine. Obviously, combustion pressure, and therefore the difference pressure integral, are usually greater at higher loads and less in light loads such as during engine idle. To provide the ability to accurately detect partial as well as complete misfires over a range of engine speeds and loads, a number of difference pressure integral thresholds can be required, with a different threshold being employed at each load level. In order to provide a single threshold, below which a partial or complete misfire can be readily detected, the present invention removes the influence of engine speed and/or loading by normalizing the difference pressure integral. By dividing the difference pressure integral by the maximum combustion chamber pressure reached after TDC, the variance due to load is substantially eliminated.

Thus, the present invention provides an improved engine misfire detection method which minimizes the effects of pressure sensor inaccuracies while being operable over a wide range of speeds and engine loads. Both partial and complete misfires are readily detectable utilizing a single threshold. This is especially useful in implementations on-board a vehicle wherein it is desirable to detect and control misfire in real time while consuming a minimum of computer power.

These and other advantages of the present invention will become apparent upon review of the following description taken in conjunction with the accompanying drawings.

BRIEF DESCRIPTION OF THE DRAWINGS

FIG. 3 is a graph of the difference pressure integral as taught by Brosi and Herden, taken under different engine loads.

FIG. 4 is a graph similar to that of FIG. 3 in which the normalized difference pressure integral obtained in accordance with the teachings of the present invention is plotted with respect to engine output power.

DETAILED DESCRIPTION OF THE PREFERRED EMBODIMENT

Figure 1:
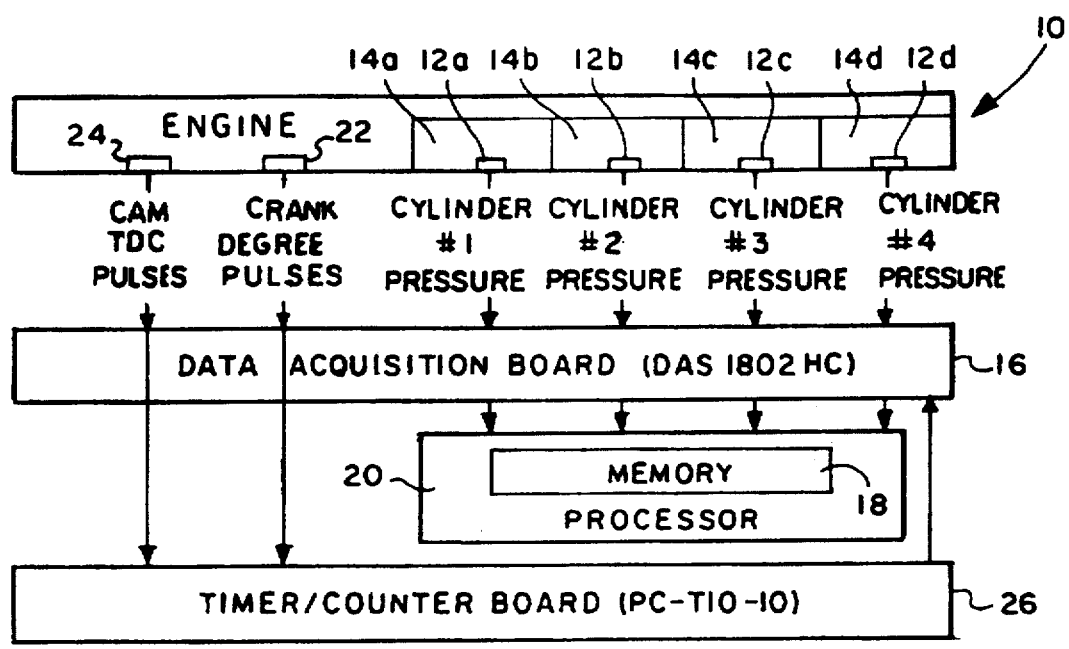
FIG. 1 is a schematic view of a misfire detection system made in accordance with the teachings of the present invention.

Turning now to the drawings, and in particular to FIG. 1, a misfire detection system for carrying out the method of the present invention on a four-cylinder internal combustion engine is indicated generally at 10. Although a four-cylinder engine is utilized herein for purposes of illustration, it should be readily appreciable that the present invention is equally well suited for use in conjunction with an engine having any number of cylinders and on any number of, or all of, an engine's cylinders. The present invention is also readily adaptable for use with two-stroke as well as four-stroke engines.

System 10 includes four cylinder pressure sensors 12a–12d, one being mounted to each of the four engine cylinders 14a-14d in a suitable manner. While any sensor suitable for producing an electrical signal indicative of cylinder pressure may be used, sensors 12a-12d are preferably of a type disclosed in U.S. Pat. No. 5,559,280 to Kovacich et al., assigned to the assignee of the present invention, the disclosure of which is hereby also incorporated herein by reference. Sensors of this type are pressure transducers mounted through a port formed in the combustion chamber such as a threaded hole in the cylinder head. These sensors generally include a pressure responsive member operable in response to sensed pressure in the combustion chamber to contact a piezoresistive beam which causes a series of piezoresistors to generate an electrical signal which is indicative of pressure forces on the member and thereby indicative of combustion chamber pressure.

Each pressure sensor 12 is electrically coupled to a data acquisition board 16, such as that commonly commercially available from National Instruments, model DHS 180 2HC. Board 16 has included therein or coupled thereto, a memory or data storage device 18 having a plurality of data memory locations for storing pressure data obtained from pressure sensors 12 as well as for holding intermediate values generated in the calculation process. These calculations, as well as various other tasks, are performed by a connected microprocessor 20. Wherein the present misfire detection system 10 is implemented to detect misfire in the internal combustion engine of a vehicle, processor 20 is preferably mounted on-board the vehicle but measurement data obtained by sensors 12 could alternately be stored for later off-board processing.

For each cylinder, pulses indicative of the instantaneous angular position of the crankshaft (the crankshaft angle θ) are obtained from a crankshaft angle sensor 22 in a manner well known to those of skill in the art. The crankshaft angle readings are sent to board 16 as are pulses indicating the top dead center (TDC) position of the piston, obtained from a one pulse per revolution sensor 24, such as a hall effect sensor, also sent to a timer/counter board 26, such as that commonly commercially available from National Instruments, model PC-T10—10. Each pressure reading obtained from a pressure sensor 12 is associated in memory 18 with the crankshaft angle at which the pressure reading was taken. In the presently preferred embodiment of the present invention, a pressure measurement is obtained or sampled at each degree of increasing crankshaft angle, but any other suitable increment may alternately be used.

Figure 2:
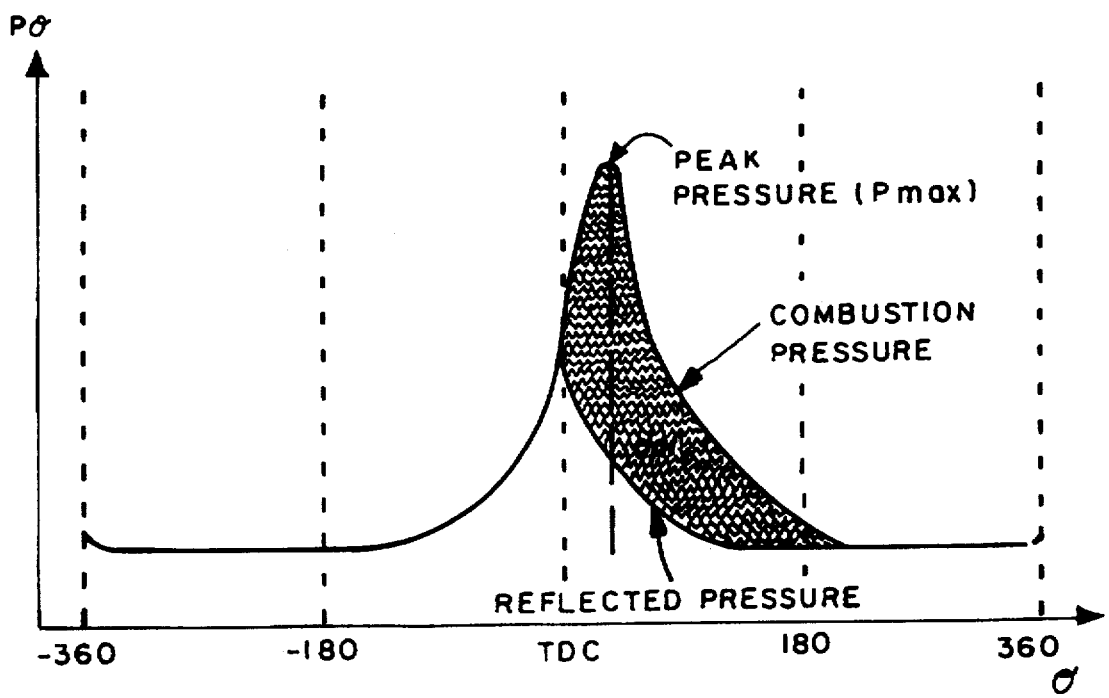
FIG. 2 is a graphic representation of the pressure values utilized in performing the method of the present invention.

Referring now to FIG. 2, the various pressures occurring in a typical power cycle of one cylinder of an internal combustion engine are plotted with respect to crankshaft angle. During a single cycle of the engine, combustion chamber pressure ($P_\theta$) generally rises to a maximum and then falls off. The compression pressure occurring at crankshaft angles prior to top dead center is produced in the combustion chamber by the motion of the piston inside the cylinder prior to ignition. During this period, the engine is acting as a compressor, compressing the air/fuel mixture for ignition. This pressure is measured by system 10 at increasing crankshaft angles up until the top dead center of the piston is reached.

To provide a complete "compression pressure" range of measurements through both the intake and power strokes, as required by the method taught herein, the curve produced by these measured values obtained at crankshaft angles prior to reaching TDC is reflected about a vertical axis running through the top dead center point. In other words, each pressure measurement is stored in a memory location associated with a predetermined crankshaft angle and for crankshaft angles above that at which the piston reaches top dead center, the measured compression pressure values are utilized in a reverse order or, alternately, stored in additional memory locations, each associated with a crankshaft angle greater than that obtained at top dead center.

From the actual combustion chamber pressure measurements obtained by sensors 12 during the combustion and exhaust strokes of the engine and the reflected compression pressure values, a "combustion pressure" can be determined. At each crankshaft angle (θ) past the top dead center point, the reflected pressure value corresponding to that angle is subtracted from the actual combustion chamber pressure measurement occurring at the same crankshaft angle. Since the reflected pressures are simply the compression pressures utilized in reverse order, this combustion pressure can be expressed as $(P_\theta - P_{(TDC-\theta)})$.

In order to most effectively utilize this combustion pressure data in detecting and controlling misfire, the integration of the combustion pressure over a crankshaft angle range that extends from top dead center to some angle after top dead center is obtained. If this difference pressure integral becomes negative in sign, misfire is presumed. While this method provides an effective way for detecting misfire as well as a method for controlling engine firing via adjustments in the crankshaft firing angle based on the difference pressure integral obtained, this method in and of itself can be sensitive to engine load levels. While generally able to detect complete engine misfires, detecting partial misfires, especially at low load conditions such as when an engine is near an idling state, has proven to be more difficult.

This is because the difference pressure integrals obtained at different engine load levels generally vary with the load. At relatively low engine load levels, pressure in the combustion chamber doesn't rise much above the compression pressure at TDC. This results in a relatively small difference between actual pressure and reflected pressure and therefore a small dpi value. As can be seen with reference to the graph of FIG. 3, illustrating the level of dpi at idle and at a loaded state, setting a threshold at a level low enough to catch misfire under low load conditions may result in the inability to detect less than complete engine misfire at higher speeds and load levels.

The system and method of the present invention, however, provides a way to normalize the difference pressure integral, in order to make it much less sensitive to load. This also enables a single threshold value to be set which can be used to effectively identify and control partial as well as complete misfire over varying engine load levels.

By taking the difference pressure integral (dpi):

$$dpi = \sum_{\theta=TDC}^{\theta=TDC+180} (P_\theta - P_{TDC-\theta})\Delta\theta$$

and the maximum or peak pressure ($P_{MAX}$), preferably by finding the maximum pressure reading obtained by sensor 12 for crankshaft angles within 60° after TDC, the following normalization of the difference pressure integral (dp̂i) is enabled:

$$\hat{dpi} = \frac{N * dpi}{P_{MAX}}$$

Since the maximum pressure is taken into account, this normalized difference pressure integral value is made insensitive to engine load levels and thereby enables the setting of a threshold level, below which either total or partial misfire is indicated. The factor N is optionally applied in order to produce resulting dpi values in a desired and convenient range. N may therefore be unity or any real number or integer. In a preferred automotive vehicle embodiment of the present invention, this threshold is generally in the range of 0 to 50% of a maximum dpi. In this exemplary embodiment, a range in θ for dpi calculation is (TDC +180°) as indicated above, but any other suitable range of angles could alternately be used. However, this range in crankshaft angles is preferably chosen so as to encompass the entire power stroke of the engine but not so large as to include the next intake and/or compression strokes.

The consistency in normalized difference pressure integral values can be seen with reference to FIG. 4 which graphically illustrates a series of normalized pressure integral values obtained under increasing power and engine loading conditions. Since all of the dpi values, irrespective of power and load, fall within the same general range, the overall magnitude of the dpi values being controlled by the selection of N, a single misfire detection threshold can be selected. For an engine which is functioning properly and having dpi values similar to those shown in FIG. 4, the threshold is preferably set so as to fall below the lowest expected normal dpi value. This threshold can be set higher to catch more minor partial misfires or lower to catch only more complete misfires, depending upon the desired functionality and accuracy of the misfire detection system.

The normalization of the difference pressure integral results in a nearly constant range of dpi values irrespective of engine speed and loads. This enables a single threshold to be set, as opposed to necessitating a different threshold level for each different operating condition of the engine, as would be required with dpi values which are not normalized in accordance with the present method, as illustrated in FIG. 3. This capability is especially valuable in vehicular applications where misfire is to be detected in real-time for up to 8 or more cylinders simultaneously, under varying engine loads as typically occur in normal driving conditions. In addition, the normalized difference pressure integral data obtained using the present invention can also be further utilized to control the engine in a manner similar to that taught by Brosi, or by any other suitable method.

The foregoing discloses and describes merely an exemplary embodiment of the present invention. One having skill in the art will readily recognize that various changes and modifications can be made thereto without departure from the spirit and scope of the present invention as set forth in the following claims.

What is claimed is:

1. A method for detecting misfire in an internal combustion engine having a crankshaft comprising the steps of:
    obtaining a series of pressure measurements in at least one combustion chamber of said engine, each said measurement being associated with an incrementally increasing angle of said crankshaft;
    generating a series of reflected compression pressure values by utilizing said pressure measurements obtained at crankshaft angles less than a predetermined angle of said crankshaft in reverse order for angles greater than said predetermined crankshaft angle;
    integrating the difference between said pressure measurements and said reflected compression pressure values over a range of crankshaft angles;
    dividing the resulting integral by the largest of said pressure measurements obtained and obtaining a normalized integral;
    defining a threshold; and
    comparing said normalized integral to said threshold wherein a misfire is detected when said normalized integral falls below said threshold.

2. The method of claim 1 further comprising the step of multiplying said integral by a predetermined factor.

3. The method of claim 2 wherein said factor is an integer.

4. The method of claim 1 wherein said method is employed in an automotive vehicular application and said threshold level is set between 0 and 50% of a maximum expected normalized pressure integral value.

5. The method of claim 1 wherein said method is employed in an automotive vehicular application and said threshold level is set to be less than a minimum expected normalized pressure integral value.

6. The method of claim 1 wherein said predetermined crankshaft angle corresponds to the top dead center position of a piston which moves in said combustion chamber.

7. The method of claim 6 wherein said largest pressure measurement is the largest said measurement obtained within 60° of said top dead center position.

8. The method of claim 6 wherein said range of crankshaft angles begins with the angle at said top dead center position of said piston.

9. The method of claim 8 wherein said range of crankshaft angles extends 180°.

10. A system for detecting misfire in an internal combustion engine having a piston which moves within a cylinder comprising:
    a pressure transducer disposed with respect to said cylinder so as to provide an electrical signal indicative of the pressure in said cylinder;
    a crankshaft angle sensor adapted to produce an electrical signal indicative of an instantaneous angle of a crankshaft connected to said piston;
    a memory device adapted to store pressure measurements obtained by said pressure transducer, each said measurement being associated with an instantaneous crankshaft angle measurement, said memory device also being adapted to store a series of reflected pressure values; and
    a processor electrically coupled to said memory device for integrating the difference between said pressure measurements and said reflected pressure values over a predefined range of crankshaft angles and for normalizing said integral by dividing said integral by the maximum pressure value stored in said memory.

11. The system of claim 9 wherein said system is implemented onboard an automotive vehicle.

* * * * *